United States Patent [19]

Plante et al.

[11] Patent Number: 4,517,025

[45] Date of Patent: May 14, 1985

[54] METHOD FOR REMOVING SEALANT CONTAMINATION

[75] Inventors: Stuart E. Plante, Abington; Susan V. Hess, Norristown, both of Pa.

[73] Assignee: Amchem Products, Inc., Ambler, Pa.

[21] Appl. No.: 379,108

[22] Filed: May 17, 1982

[51] Int. Cl.$^3$ .............................. B08B 3/08
[52] U.S. Cl. ...................... 134/38; 134/40; 252/173; 252/527
[58] Field of Search ............ 134/3, 38, 40; 252/106, 252/140, 173, 527, DIG. 8

[56] References Cited

U.S. PATENT DOCUMENTS

| | | | |
|---|---|---|---|
| 1,000,388 | 8/1911 | Ellis | 252/DIG. 8 X |
| 1,143,111 | 6/1915 | Ellis | 252/DIG. 8 X |
| 1,530,683 | 3/1925 | Mallard | 252/DIG. 8 X |
| 3,106,929 | 10/1963 | Friedrich | 134/38 |
| 3,574,123 | 4/1971 | Laugle | 134/38 X |
| 3,669,740 | 6/1972 | Yamamoto et al. | 134/38 X |
| 3,794,524 | 2/1974 | Nogueira et al. | 134/38 X |
| 4,168,989 | 9/1979 | Edelman et al. | 134/38 X |
| 4,239,552 | 12/1980 | Perner et al. | 252/173 X |
| 4,239,641 | 12/1980 | Perner et al. | 252/173 X |
| 4,284,434 | 11/1979 | Lingmann et al. | 134/2 |
| 4,310,432 | 1/1982 | Brouwer | 252/173 X |

FOREIGN PATENT DOCUMENTS 1143976  2/1969  United Kingdom .

*Primary Examiner*—Marc L. Caroff
*Attorney, Agent, or Firm*—Ernest G. Szoke; Henry E. Millson, Jr.; Mark A. Greenfield

[57] ABSTRACT

Cleaning solutions and processes for removing contaminating sealants used in the automotive and allied industries from water-insoluble surfaces. The cleaning solutions are aqueous solutions containing at least one $C_5$–$C_9$ alkanoic acid, and optionally, other ingredients such as alkali metal phosphates, surfactants, etc.

10 Claims, No Drawings

METHOD FOR REMOVING SEALANT CONTAMINATION

BACKGROUND OF THE INVENTION

Cleaning solutions containing a salt such as an alkanolamine salt of a $C_6$–$C_{12}$ branched or straight chain aliphatic carboxylic acid, a nonionic surfactant, and a surface-active quaternary ammonium compound are known to the art for degreasing and cleaning metal parts while at the same time protecting the metal parts against corrosion. Such compositions are disclosed, for example, in U.S. Pat. No. 4,284,434, issued Aug. 18, 1981 to Herbert Lingmann, Herman Drosdziok, and Rudolf Peifer and assigned to Henkel Kommanditgesellschaft auf Aktien. These compositions have many commercial uses, including use in automotive assembly lines, where automotive body and other metal components must be cleaned of metal fines and the lubricating oils which are used during their manufacture and assembly.

One of the most difficult problems in cleaning automotive bodies prior to the finishing steps leading to the application of automotive paint is in the removal of unwanted sealants commonly used in sealing and waterproofing joints and openings between metal parts. When such sealants are used, usually by means of extrusion through grease guns, excess quantities of sealant frequently are extruded or dripped onto the adjacent metal parts, and such excess must be removed from the metal before the application of a conversion coating prior to painting. The only known practical method of removing such unwanted sealants is by the use of kerosene. However, kerosene has many disadvantages, including toxicity to the workers using it on prolonged exposure; flammability problems; unpleasant odor; the necessity for repeated applications of the kerosene to heavy accumulations of sealant, since the sealant is not that readily soluble in the kerosene; and the problem of removing excess kerosene from the metal parts, since kerosene has low water solubility and cannot be readily removed by use of a water rinse. In fact, when automotive bodies containing areas coated with kerosene are immersed one after the other in a standard cleaning solution prior to the application of a conversion coating to the metal bodies, the bath relatively rapidly becomes contaminated and rendered ineffective by the kerosene, requiring frequent down time and expense in draining the kerosene contaminated bath and making up a fresh bath.

Heretofore the above disadvantages of kerosene use had to be tolerated since no commercially alternative method of removing contaminating sealants was known.

DESCRIPTION OF THE INVENTION

There has now been discovered compositions and processes for removing contaminating sealants from water-insoluble surfaces utilizing compositions which do not contain kerosene or any other hydrocarbon solvent base.

The sealants commonly used in the automotive and allied industries are compositions containing a resin such as an epoxy resin or a vinyl resin, e.g. polyvinyl chloride resin; a heavy blending oil such as linseed oil, dioxylphthalein, diethylphthalein, dibutylphthalein, etc., a fixotrope, e.g. CARBOSIL; and a filler such as calcium carbonate or limestone. Such sealants are of course water-insoluble, since their purpose and use as sealants is to seal and waterproof the joints and openings in which they are used. These sealants are also used in allied industries, such as the aviation industry, in the manufacture of trucks and buses, and in the manufacture of tractors and other motorized farm equipment.

The novel sealant-removing compositions of the invention are aqueous solutions containing at least one $C_5$–$C_9$ straight or branched chain alkanoic acid in an amount sufficient to remove a contaminating sealant from a water-insoluble surface when the solution is brought into contact with such unwanted sealant. In general, a total of at least about 0.8 grams per liter of an alkanoic acid or a combination of two or more of such alkanoic acids is present in the aqueous solution in order to achieve the desired effect. Larger quantities of alkanoic acids can also be used, e.g. up to the maximum solubility of the alkanoic acid or combination of alkanoic acids in the aqueous solution at room temperature. Preferably, the quantity of alkanoic acid or combination of such acids is in the range of about 2.5 grams of about 150 grams per liter, and most preferably in the range of about 8 to about 60 grams per liter. Since some of the $C_5$–$C_9$ alkanoic acids are not soluble in water at room temperature throughout the above range, solubilizing techniques are preferably employed to maintain the alkanoic acids in solution. Such solubilizing techniques are described below in the description of the novel concentrates of the invention.

Examples of $C_5$–$C_9$ alkanoic acids that can be employed alone or in combination in the practice of the invention include valeric acid, isovaleric acid, 3-methylpentanoic acid, caproic acid, enanthic acid, caprylic acid, isooctanoic acid, 4-ethyl hexanoic acid, pelargonic acid, heptanoic acid, and isononanoic acid.

The aqueous sealant-removing compositions of the invention can also contain various optional ingredients. One or more of the following optional ingredients may be added as desired:

1. It has been discovered that the presence of at least one alkali metal phosphate or condensed phosphate salt in the aqueous sealant-removing compositions of the invention markedly enhances the effectiveness of the composition, and the presence of a phosphate, while optional, is therefore preferred in the compositions of the invention. Further more, the presence of an alkali metal phosphate salt significantly enhances the solubility of the $C_5$–$C_9$ alkanoic acid, so that more concentrated solutions thereof can be formulated as desired. Hence, the presence of the phosphate salt permits the formation of homogeneous concentrates which are suitable for dilution by the end user just prior to use.

The alkali metal phosphate and condensed phosphate salts that can be employed alone or in combination of two or more include those having a sodium, potassium or cesium cation and a phosphate, tripolyphosphate, pyrophosphate or metaphosphate anion. Trisodium phosphate and potassium tripolyphosphate are preferred salts for use either alone or in combination with each other.

It is preferred that the alkali metal phosphate salt or combination of such salts be present in total quantity of at least about 0.1 grams/liter and preferably from about 6 to about 130 grams/liter of solution.

2. At least about 0.1 grams per liter, preferably from about 6 to about 130 grams per liter, of one or a combination of phosphonic acids and/or sulfonic acids. Alkyl, aryl, or aralkyl sulfonic or phosphonic acids, or an acyl phosphonic acid, can be employed. When an alkyl sulfonic or phosphonic acid is used herein, the alkyl group can be a straight or branched chain alkyl group preferably having from 1 to 24 carbon atoms. Aryl sulfonic or phosphonic acids can be alkyl substituted or unsubstituted phenyl or naphthyl groups, such as phenyl, tolyl, xylyl, dodecylphenyl, etc. wherein the alkyl groups preferably have from 1 to 24 carbon atoms. Aralkyl sulfonic or phosphonic acids are those wherein the aralkyl group is preferably phenylalkyl or naphthylalkyl with the alkyl group preferably having from 1 to 24 carbon atoms, such as benzyl, phenylethyl, etc. Acyl phosphonic acids are those wherein the acyl group is an alkanoyl group preferably having from 2 to 24 carbon atoms, such as aceto, propanoyl, etc. Examples of particularly useful compounds include acetophosphonic acid and p-dodecylbenzene sulfonic acid.

The sulfonic and/or phosphonic acids can be employed in the form of a salt, e.g., as an alkali metal salt.

The sulfonic and phosphonic acids and their salts often act as emulsifying agents, which both enhance the solubility of the alkanoic acids in the compositions of the invention and emulsify any oils present on the surfaces to be cleaned therewith.

3. Small quantities of a surfactant or combination of two or more surfactants may be added to enhance the cleaning effect of the composition, i.e. to facilitate removal of shop dirt, lubricating and treating oils, marks from high light marking pens, etc. In general, when a surfactant or combination of surfactants is employed, the total amount of surfactant present is at least about 0.1 g/l and preferably from about 1 to about 50 g/l. Low foaming, nonionic surfactants are preferred. Examples of surfactants that can be employed alone or in combination are:

POLY-TERGENT S-205LF (Olin Mathieson Company), a polyoxyethylene-polyoxypropylene alcohol;

TRITON DF-16 (Rohm & Haas Co.) a nonionic surfactant believed to be a modified polyethoxylated straight chain alcohol;

POLY-TERGENT S-505LF (Olin Corp.) a nonionic surfactant believed to be a modified polyethoxylated straight chain alcohol;

SURFONIC LF-17 (Texaco Chemical Co.) a nonionic surfactant believed to be an alkyl polyethoxylated ether;

PLURAFAC RA-30 (BASF Wyandotte Corp.) a nonionic surfactant, believed to be a modified oxyethylated straight chain alcohol;

PLURAFAC D-25 (BASF Wyandotte Corp.) a nonionic surfactant believed to be a modified oxyethylated straight chain alcohol;

TRITON X-102 (Rohm & Haas Co.) a nonionic surfactant believed to be an octyl phenoxy polyethoxy ethanol;

GENAPOL PN-30 (American Hoechst Co.), a nonionic surfactant believed to be composed of ethylene diamine containing about 30 moles of ethylene oxide and about 60 moles of propylene oxide;

ETHOMEEN C/20 (Armak Co.), a nonionic surfactant believed to be a coconut oil amine containing about 10 moles of ethylene oxide;

ANTAROX BL 330 (GAF Corp.) a nonionic surfactant believed to be an alkyl poly(ethyleneoxy)ethanol;

TRITON CF-10 (Rohm & Haas Co.) a nonionic surfactant, and believed to be an alkylaryl polyether having a carbon chain of about 14 carbon atoms and approximately 16 moles of ethoxylation;

SURFACTANT AR 150 (Hercules, Inc.) a nonionic surfactant, and believed to be an ethoxylated abietic acid derivative with approximately 15 moles of ethoxylation;

PLURONIC L061 (BASF Wyandotte, Inc.) a nonionic surfactant, and believed to be a condensate containing only ethylene oxide and propylene oxide chains;

ANTAROX LF-330 (GAF Corp.) a nonionic surfactant, believed to be an alkyl poly(ethyleneoxy)ethanol;

PEGOSPERSE 700-TO (Glyco Chemicals, Inc.) a nonionic surfactant, and believed to be an abietic acid ester containing approximately 14 to 16 moles of ethoxylation;

IGEPAL CA-630 (GAF Corp.) a nonionic surfactant, believed to be an alkyl phenoxy poly(ethyleneoxy)ethanol;

TRYCOL LF-1 (Emery Industries, Inc.) a nonionic surfactant believed to be an alkyl poly ether;

RENEX 20 (I.C.I. United States, Inc.) a nonionic, polyoxyethylene ester of mixed fatty acids and resin acids;

MIRAWET B (Miranol Co.) an anionic surfactant, sodium 2-butoxyethoxyacetate;

SURFONIC LF-7 (Texaco Chemical Co.) a nonionic surfactant believed to be an alkyl polyethoxylated ether;

TERGITOL ANIONIC-08 (Union Carbide Corporation) an anionic surfactant believed to be sodium 2-ethyl hexyl sulfate.

4. At least about 0.1 gram per liter, preferably from about 6 to about 130 grams per liter of an alkali metal silicate, e.g. sodium silicate, potassium metasilicate, etc. The alkali metal silicate may be added to enhance the sealant-removing activity of the compositions.

5. From about 0.1 to about 125 grams per liter of an alkali metal borate or condensed borate, e.g. sodium borate, potassium fluoborate, etc., to enhance the sealant-removing activity of the compositions.

6. From about 5 to about 200 grams per liter of an alkali metal hydroxide and/or one or more amines such as ammonia, an alkanolamine, e.g. mono- di- or triethanolamine, propanolamine, etc., to increase the solubility of the $C_5$–$C_9$ alkanoic acid in the solution, and, in the case of the alkanolamines, to also provide a rust protection activity.

7. A quantity of a $C_1$–$C_3$ alkanol or a $C_2$–$C_3$ glycol, e.g. ethanol, propanol, ethylene glycol, propylene glycol, etc., sufficient to solubilize the $C_{5-C_9}$ alkanoic acid in the solution.

8. From about 0.1 to about 150 g/l of a biocide, e.g. a hexahydrotriazine derivative, a phenol or a chlorophenol, a quaternary ammonium compound such as an alkyl dimethyl benzyl ammonium chloride, etc., to prevent contamination with bacteria or fungi.

9. Small quantities of a thickening agent, e.g. hydroxyethylcellulose, to increase the viscosity of the composition, if desired.

10. Small quantities of a water soluble dye or dyes or assist in rapid identification of the composition.

11. Small quantities of perfumes, e.g. lemon oil, to mask or improve the odor of the composition.

Also included within the scope of the present invention are aqueous concentrates of the aqueous sealant-removing compositions of the invention. Such concentrates are formulated to give the aqueous compositions of the invention upon controlled dilution of the concentrate with a measured quantity of water. Since the $C_5$–$C_9$ alkanoic acids have limited water solubility, it is useful when forming the concentrates of the invention to include a solubility enhancing agent, i.e. one or more of an amine, an alkali, metal hydroxide, an emulsifying agent, or an alcohol or glycol. Preferably the above concentrates are formulated so that a solution of from 10% to 25% of the concentrate in water provides the aqueous sealant-removing compositions of the invention.

The novel process of the invention is carried out by contacting the surface of a water-insoluble material, such as a metal automotive component, that is contaminated with a resin-containing sealant, with an aqueous composition of the invention. Methods of contacting include spraying, immersion, wiping with a sponge or brush or cloth soaked with an aqueous composition of the invention, or a combination of these methods. Excess solution present on the surface need not be removed before the next step in the automotive production line, i.e. immersion in the cleaning solution preceding the conversion coating bath, since the aqueous compositions of the invention will not contaminate such cleaning solution, which is a liability of kerosene as stated earlier. When a spray process is used, only small quantities of the aqueous compositions of the invention are required, i.e. the spray is misted on the water-insoluble surface under low pressure e.g. 40–60 psi, followed usually by manual rubbing or automatic brushing.

Examples of sealants that can be removed by the process and compositions of the invention are:

GM 998-1263, a polyvinyl chloride plastisol sealer manufactured by Union City Industries, Union City, Mich.

GM 998-1553, a polyvinyl chloride plastisol sealer manufactured by Hughes Chemical Co., Madison Heights, Mich.

GM 998-1301, a red sealer having a linseed oil base, manufactured by J. W. Mortell, Warren, Mich.

M4G145C, a pink sealer used by the Ford Motor Company.

M4G161C, a white sealer used by the Ford Motor Company.

GM 998-1981, a black sealer used by the General Motors Corporation.

The invention will be better understood from the following examples, which are given for illustration purposes only and not to limit the invention.

EXAMPLES I–IV

Compositions were formulated by dissolving the following alkanoic acids in deionized water at room temperature in the concentrations shown in Table I below:

TABLE I

| Example | Alkanoic Acid | Concentration |
|---|---|---|
| I | Valeric acid | 0.8 g/l |
| II | Caproic acid | 0.8 g/l |
| III | Caprylic acid | 0.8 g/l |
| IV | Isononanoic acid | 0.8 g/l |

Rags were dipped into the above solutions and the wet rags used to wipe the surfaces of steel sheets to which a coating (about 1–3 mm thickness) of one of the following sealants had been applied, using a fresh wet rag for each test:

(a) Grey sealant, GM 998-1263
(b) Grey sealant, GM 998-1553
(c) Red sealant, GM 998-1301

The solution of Examples I, II, III, and IV were all effective in removing each of the above sealants from the steel sheets.

When the same test was run using a solution of each of the following acids at a concentration of 0.8 g/l, in no instance was the solution effective against all three of the above sealants—glycolic acid, benzoic acid, acetic acid, myristic acid, malonic acid, capric acid, lauric acid, gluconic acid, 1,2,3-propanetricarboxylic acid, phthalic acid, sebacic acid, maleic acid, and propanoic acid.

EXAMPLE V

A composition was formulated by dissolving the following ingredients in deionized water at room temperature:

| Ingredient | Concentration |
|---|---|
| Isononanoic acid | 22.7 g/l |
| Poly-Tergent S-205LF | 8.3 g/l |

The above composition was treated by dipping rags into the composition and wiping a steel plate coated with one of the following sealants:

Black sealant, GM 998-1981
Red sealant, GM 998-1301.

In each instance the above composition rapidly removed the sealant from the surface of the steel plate.

EXAMPLE VI

A solution was formed from the following ingredients by dissolving the ingredients in deionized water at room temperature.

| Ingredient | Concentration |
|---|---|
| Isononanoic acid | 10.4 g/l |
| Trisodium phosphate | 25.4 g/l |

The above solution was then applied by use of wet rags to four steel sheets each coated with one of the sealants given in Examples I–IV above.

In each instance, the sealant was removed rapidly and effectively by one wiping of the wet rag.

EXAMPLES VII–VIII

A solution was formed by dissolving the following ingredients in deionized water at room temperature:

| Example | Ingredient | Concentration |
|---|---|---|
| VII | Isononanoic acid | 10.4 g/l |
|  | Potassium tripolyphosphate | 54.6 g/l |
|  | ETHOMEEN C/20 | 4.6 g/l |
|  | GENAPOL PN30 | 4.6 g/l |
| VIII | Isononanoic acid | 10.4 g/l |
|  | Potassium tripolyphosphate | 25.4 g/l |
|  | ETHOMEEN C/20 | 4.6 g/l |
|  | GENAPOL PN30 | 4.6 g/l |

When the above solutions were tested against Black Sealant No. GM 998-1981 and Red Sealant No. GM 998-1301 using the test process of EXAMPLE I, the above solutions rapidly and thoroughly removed each sealant with one wiping.

EXAMPLE IX

An aqueous solution was prepared by mixing together the following quantities of ingredients:

| Ingredient | Grams/Liter |
| --- | --- |
| Triethanolamine (85% active) | 103.0 |
| Monoethanolamine | 51.5 |
| Isononanoic acid | 113.3 |
| 1,3,5-tris-β-hydroxyethyl-hexahydro-S—triazine | 60.8 |
| n-alkyl dimethyl benzyl ammonium chloride (80% solution) | 3.9 |
| POLY-TERGENT S-205LF | 41.2 |
| Deionized water | q.s. |

The above solution was used full strength by dipping a cloth rag into the solution at ambient temperature and using the rag soaked with the solution to wipe the surfaces of automobile bodies containing excess sealants GM998-1263 and GM998-1553 on portions of the bodies. The excess sealants were removed with one wiping of the rag.

The above solution was then diluted with tap water to a 15% concentration, and misted onto car bodies containing the above excess sealants using a spray nozzle and about 50 psi pressure. Clean cloth rags were then used to wipe the bodies. The excess sealants were removed with one wiping.

EXAMPLE X

An aqueous solution was prepared by mixing together the following quantities of ingredients:

| Ingredient | Grams/Liter |
| --- | --- |
| Triethanolamine (85% active) | 103.0 |
| Monoethanolamine | 51.5 |
| Isononanoic acid | 113.3 |
| POLY-TERGENT S-205LF | 41.2 |
| Deionized water | q.s. |

The above solution was used full strength by dipping a cloth rag into the solution at ambient temperature and using the rag soaked with the solution to wipe the surfaces of automobile bodies containing excess sealants GM998-1263 and GM998-1553 on portions of the bodies. The excess sealants were removed with one wiping of the rag.

The above solution was then diluted with tap water to a 15% concentration, and misted onto car bodies containing the above excess sealants using a spray nozzle and about 50 psi pressure. Clean cloth rags were then used to wipe the bodies. The excess sealants were removed with one wiping.

EXAMPLE XI

An aqueous solution was prepared by mixing together the following quantities of ingredients:

| Ingredients | Grams/Liter |
| --- | --- |
| Triethanolamine (85% active) | 154.5 |
| Isononanoic acid | 113.3 |
| POLY-TERGENT S-205LF | 41.2 |
| Deionized water | q.s. |

The above solution was used full strength by dipping a cloth rag into the solution at ambient temperature and using the rag soaked with the solution to wipe the surfaces of automobile bodies containing excess sealants GM998-1263 and GM998-1553 on portions of the bodies. The excess sealants were removed with one wiping of the rag.

The above solution was then diluted with tap water to a 15% concentration, and misted onto car bodies containing the above excess sealants using a spray nozzle and about 50 psi pressure. Clean cloth rags were then used to wipe the bodies. The excess sealants were removed with one wiping.

What is claimed is:

1. A process for removing a sealant containing a resin, a heavy blending oil, a fixotrope, and a filler from a water-insoluble surface contaminated therewith comprising contacting said surface with an aqueous solution at ambient temperature consisting essentially of
    (a) from about 0.8 to about 150 g/l of at least one $C_5$–$C_9$ alkanoic acid;
    (b) from about 6 to about 130 g/l of at least one of an alkali metal phosphate and a condensed phosphate salt;
    (c) from about 0.1 to about 50 g/l of at least one surfactant;
    (d) 0 to about 130 g/l of at least one of a phosphonic acid and a sulfonic acid;
    (e) 0 to about 130 g/l of at least one alkali metal silicate;
    (f) 0 to about 125 g/l of at least one of an alkali metal borate and a condensed borate;
    (g) 0 to about 200 g/l of at least one of an alkali metal hydroxide and an amine;
    (h) 0 to a quantity of at least one of a $C_1$–$C_3$ alkanol and a $C_2$–$C_3$ glycol sufficient to solubilize component (a);
    (i) 0 to about 150 g/l of a biocide; and, optionally,
    (j) a small quantity of at least one of a thickening agent, a water soluble dye, and a perfume.

2. A process in accordance with claim 1 wherein the aqueous solution is sprayed on said surface.

3. A process in accordance with claim 1 wherein the alkanoic acid in (a) is selected from the group consisting of valeric acid, isovaleric acid, caproic acid, enanthic acid, caprylic acid, isooctanoic acid, pelargonic acid, isononanoic acid, and mixtures thereof.

4. A process in accordance with claim 1 wherein the alkanoic acid component (a) is isononanoic acid.

5. A process in accordance with claim 1 wherein the alkali metal phosphate salt in component (b) is potassium tripolyphosphate.

6. A process in accordance with claim 1 wherein the alkali metal phosphate salt in component (b) is trisodium phosphate.

7. A process in accordance with claim 1, 2, 3, or 4 wherein the water-insoluble surface is the surface of an automobile body member.

8. A process in accordance with claim 1 wherein the total quantity of alkanoic acid in component (a) is about 2.5 to about 150 grams per liter.

9. A process in accordance with claim 1 wherein the total quantity of alkanoic acid in component (a) is about 8 to about 60 grams per liter.

10. A process in accordance with claim 1 wherein component (c) is present in from about 1 to about 50 g/l.

* * * * *